United States Patent
Sutton, II et al.

(10) Patent No.: US 7,693,286 B2
(45) Date of Patent: *Apr. 6, 2010

(54) METHOD OF DELIVERING DIRECT PROOF PRIVATE KEYS IN SIGNED GROUPS TO DEVICES USING A DISTRIBUTION CD

(75) Inventors: James A. Sutton, II, Portland, OR (US); Clifford D. Hall, Orangevale, CA (US); Ernie F. Brickell, Portland, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1539 days.

This patent is subject to a terminal disclaimer.

(21) Appl. No.: 10/892,280

(22) Filed: Jul. 14, 2004

(65) Prior Publication Data

US 2006/0013400 A1    Jan. 19, 2006

(51) Int. Cl.
*H04L 9/08* (2006.01)
*H04L 9/00* (2006.01)
*H04L 9/32* (2006.01)

(52) U.S. Cl. ............... 380/282; 380/277; 380/278; 380/279; 380/259; 713/168; 713/171; 713/176; 713/180; 713/181

(58) Field of Classification Search ............ 380/259, 380/277, 278, 279, 282; 726/16, 20; 713/168, 713/171, 176, 180, 181
See application file for complete search history.

(56) References Cited

U.S. PATENT DOCUMENTS 5,724,425 A * 3/1998 Chang et al. ............ 705/52

(Continued)

FOREIGN PATENT DOCUMENTS

CN    1985466    6/2007

(Continued)

OTHER PUBLICATIONS

Menezes. Handbook of Applied Cryptography. CRC Press, Boca Raton. 1997.*

(Continued)

*Primary Examiner*—Kim Vu
*Assistant Examiner*—Randal D Moran
(74) *Attorney, Agent, or Firm*—Trop, Pruner & Hu, P.C.

(57) ABSTRACT

Delivering a Direct Proof private key in a signed group of keys to a device installed in a client computer system in the field may be accomplished in a secure manner without requiring significant non-volatile storage in the device. A unique pseudo-random value is generated and stored along with a group number in the device at manufacturing time. The pseudo-random value is used to generate a symmetric key for encrypting a data structure holding a Direct Proof private key and a private key digest associated with the device. The resulting encrypted data structure is stored in a signed group of keys (e.g., a signed group record) on a removable storage medium (such as a CD or DVD), and distributed to the owner of the client computer system. When the device is initialized on the client computer system, the system checks if a localized encrypted data structure is present in the system. If not, the system obtains the associated signed group record of encrypted data structures from the removable storage medium, and verifies the signed group record. The device decrypts the encrypted data structure using a symmetric key regenerated from its stored pseudo-random value to obtain the Direct Proof private key, when the group record is valid. If the private key is valid, it may be used for subsequent authentication processing by the device in the client computer system.

41 Claims, 12 Drawing Sheets

U.S. PATENT DOCUMENTS

| | | | | |
|---|---|---|---|---|
| 5,771,291 | A * | 6/1998 | Newton et al. | 713/185 |
| 5,857,021 | A * | 1/1999 | Kataoka et al. | 705/54 |
| 5,924,094 | A | 7/1999 | Sutter | |
| 6,032,260 | A | 2/2000 | Sasmazel et al. | |
| 6,032,261 | A | 2/2000 | Hulyalkar | |
| 6,036,061 | A | 3/2000 | O'Donnell | |
| 6,036,601 | A | 3/2000 | Heckel | |
| 6,151,676 | A * | 11/2000 | Cuccia et al. | 713/176 |
| 6,185,316 | B1 * | 2/2001 | Buffam | 382/115 |
| 6,389,403 | B1 * | 5/2002 | Dorak, Jr. | 705/52 |
| 6,826,616 | B2 * | 11/2004 | Larson et al. | 709/228 |
| 7,178,030 | B2 | 2/2007 | Scheidt et al. | 713/176 |
| 7,216,110 | B1 | 5/2007 | Ogg et al. | |
| 2001/0044886 | A1 * | 11/2001 | Cassagnol et al. | 711/163 |
| 2002/0044567 | A1 | 4/2002 | Voit et al. | |
| 2002/0065136 | A1 | 5/2002 | Day | |
| 2002/0080190 | A1 * | 6/2002 | Hamann et al. | 345/810 |
| 2002/0166053 | A1 * | 11/2002 | Wilson | 713/189 |
| 2002/0178534 | A1 | 12/2002 | Massaro | |
| 2003/0037237 | A1 | 2/2003 | Abgrall et al. | |
| 2003/0105718 | A1 * | 6/2003 | Hurtado et al. | 705/51 |
| 2003/0114144 | A1 | 6/2003 | Minemura | 455/410 |
| 2003/0182584 | A1 * | 9/2003 | Banes et al. | 713/202 |
| 2004/0039924 | A1 | 2/2004 | Baldwin et al. | |
| 2004/0103281 | A1 | 5/2004 | Brickell | |
| 2006/0013399 | A1 | 1/2006 | Brickell et al. | |
| 2006/0013402 | A1 | 1/2006 | Sutton et al. | 380/282 |
| 2006/0117181 | A1 * | 6/2006 | Brickell | 713/176 |

FOREIGN PATENT DOCUMENTS

| | | |
|---|---|---|
| CN | 101019368 | 8/2007 |
| CN | 101019369 | 8/2007 |
| DE | 112005001666 T5 | 5/2007 |
| DE | 112005001672 T | 5/2007 |
| DE | 112005001654 T5 | 11/2007 |
| EP | 0 877 314 A1 | 11/1998 |
| EP | 1 067 470 A2 | 1/2001 |
| EP | 1 617 587 A1 | 1/2006 |
| GB | 2439160 A | 12/2007 |
| WO | 99/31842 | 6/1999 |
| WO | WO 00/49764 A1 | 8/2000 |
| WO | WO 00/69206 A1 | 11/2000 |
| WO | WO 01/43476 A1 | 6/2001 |
| WO | WO 01/63954 A1 | 8/2001 |
| WO | WO 02/45453 A1 | 6/2002 |
| WO | WO 02/073928 A1 | 9/2002 |
| WO | WO 2006/019614 A2 | 2/2006 |
| WO | WO 2006/023151 A2 | 3/2006 |
| WO | WO 2006/025952 A2 | 3/2006 |

OTHER PUBLICATIONS

PCT Search Report and Written Opinion dated Oct. 6, 2005.

Menezes, et al., *Handbook of Applied Cryptography*, CRC Press, LLC, pp. 321-322, 330-331, 388-390, 394-395, 397-398, 472, 515-516, & 548-552, (1997).

International Application No. PCT/US2005/024253, International Search Report.

PCT, Preliminary Report on Patentability (Chapter I of the Patent CoOperation Treaty), Application No. PCT/US2005/024486, mailed Jan. 25, 2007.

PCT, International Search Report and Written Opinion of the International Searching Authority, Application No. PCT/US2005/024486, mailed Sep. 18, 2006.

PCT, International Search Report and Written Opinion of the International Searching Authority, Application No. PCT/US2005/024374, mailed Sep. 18, 2006.

PCT, Preliminary Report on Patentability (Chapter I of the Patent CoOperation Treaty), Application No. PCT/US2005/024374, mailed Jan. 25, 2007.

PCT, International Search Report and Written Opinion of the International Searching Authority, Application No. PCT/US2005/024253, mailed Sep. 18, 2006.

PCT, Preliminary Report on Patentability (Chapter I of the Patent CoOperation Treaty), Application No. PCT/US2005/024253, mailed Jan. 25, 2007.

Menezes et al., Hash Functions and Date Integrity, CRC Press Inc., 1997, Chapter 9, 19 pages.

U.S. Patent and Trademark Office Official Action in related U.S. Appl. No. 10/892,265 dated Sep. 12, 2007, with corresponding Reply to Official Action filed Jan. 24, 2008.

U.S. Patent and Trademark Office Final Official Action in related U.S. Appl. No. 10/892,265 dated Apr. 17, 2008, with corresponding Reply to Final Official Action filed Jun. 17, 2008.

U.S. Patent and Trademark Office Official Action in related U.S. Appl. No. 10/892,256 dated Jul. 23, 2007, with corresponding Reply to Official Action filed Dec. 20, 2007.

U.S. Patent and Trademark Office Final Official Acton in related U.S. Appl. No. 10/892,256 dated Apr. 1, 2008, with corresponding Reply to Final Official Action filed May 30, 2008, Advisory Action mailed on Jun. 16, 2008 with Request for Continued Examination (RCE) filed on Jun. 30, 2008.

Korean Intellectual Property Office Notice of Preliminary Rejection Dated Feb. 26, 2008, With English Language Translation, pp. 1-6.

English Language Translation of Korean Intellectual Property Office Notice of Preliminary Rejection Dated May 24, 2008, pp. 1-3.

English Language Translation of Korean Intellectual Property Office Notice of Preliminary Rejection Dated Aug. 22, 2008.

UK Intellectual Property Office Examination Report Dated Jul. 14, 2008.

U.S. Patent and Trademark Office Official Action in related U.S. Appl. No. 10/892,256 dated Sep. 29, 2008, with corresponding Reply to Official Action filed Dec. 24, 2008.

U.S. Patent and Trademark Office Official Action in related U.S. Appl. No. 10/892,265 dated Nov. 25, 2008, with corresponding Reply to Official Action filed Feb. 25, 2009.

The Patent Office of the State Intellectual Office of the People's Republic of China, First Office Action dated Apr. 3, 2009, in a related application.

German Patent and Trademark Office, Office Action dated May 26, 2009, in a related application.

U.S. Patent and Trademark Office, Final Office Action dated Mar. 24, 2009 in related U.S. Appl. No. 10/892,256.

U.S. Patent and Trademark Office, Office Action dated Jun. 15, 2009, with Reply to Office Action filed on Sep. 15, 2009, in related U.S. Appl. No. 10/892,265.

* cited by examiner

METHOD OF DELIVERING DIRECT PROOF PRIVATE KEYS IN SIGNED GROUPS TO DEVICES USING A DISTRIBUTION CD

BACKGROUND

1. Field

The present invention relates generally to computer security and, more specifically, to securely distributing cryptographic keys to devices in processing systems.

2. Description

Some processing system architectures supporting content protection and/or computer security features require that specially-protected or "trusted" software modules be able to create an authenticated encrypted communications session with specific protected or "trusted" hardware devices in the processing system (such as graphics controller cards, for example). One commonly used method for both identifying the device and simultaneously establishing the encrypted communications session is to use a one-side authenticated Diffie-Hellman (DH) key exchange process. In this process, the device is assigned a unique public/private Rivest, Shamir and Adelman (RSA) algorithm key pair or a unique Elliptic Curve Cryptography (ECC) key pair. However, because this authentication process uses RSA or ECC keys, the device then has a unique and provable identity, which can raise privacy concerns. In the worst case, these concerns may result in a lack of support from original equipment manufacturers (OEMs) for building trustable devices providing this kind of security.

BRIEF DESCRIPTION OF THE DRAWINGS

The features and advantages of the present invention will become apparent from the following detailed description of the present invention in which.

DETAILED DESCRIPTION

Figure 1:
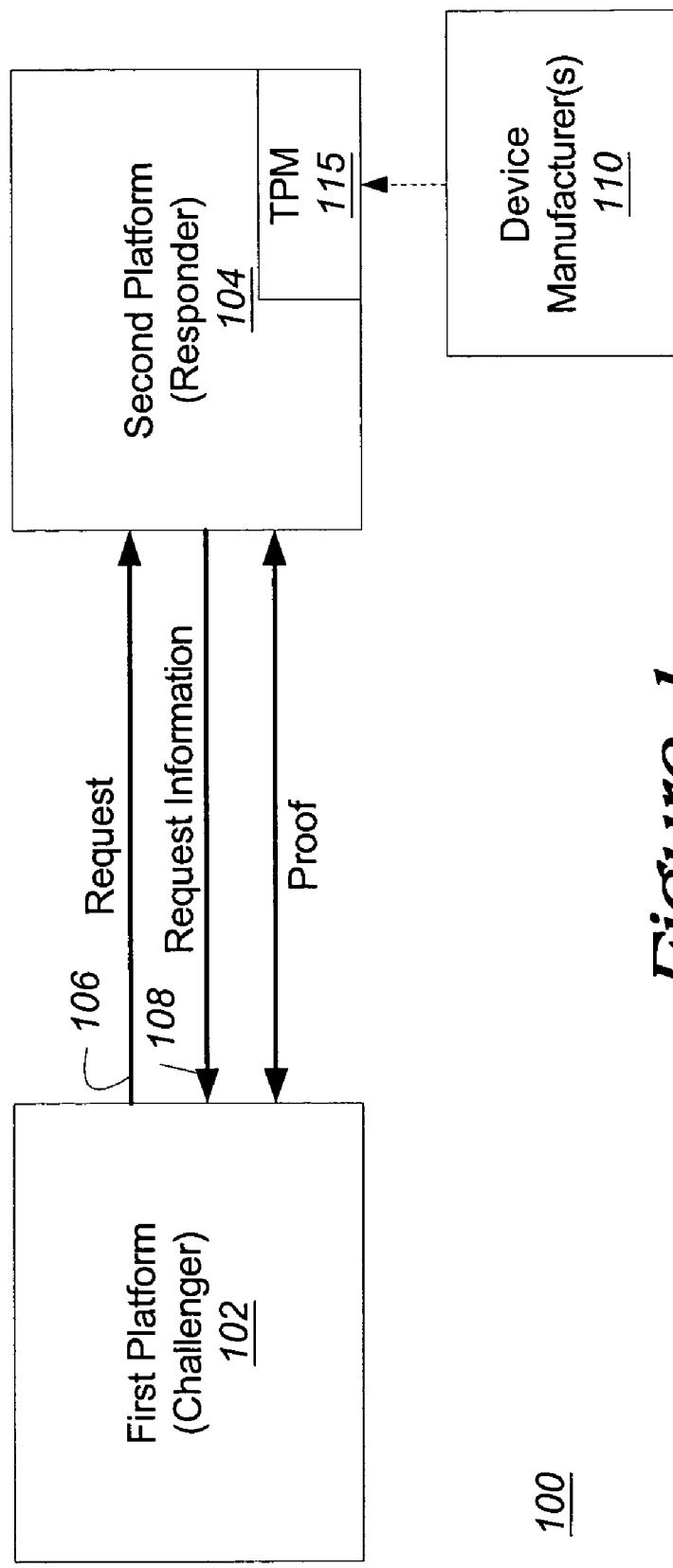
FIG. 1 illustrates a system featuring a platform implemented with a Trusted Platform Module (TPM) that operates in accordance with one embodiment of the invention.

Using the Direct Proof-based Diffie-Hellman key exchange protocol to permit protected/trusted devices to authenticate themselves and to establish an encrypted communication session with trusted software modules avoids creating any unique identity information in the processing system, and thereby avoids introducing privacy concerns. However, directly embedding a Direct Proof private key in a device on a manufacturing line requires more protected non-volatile storage on the device than other approaches, increasing device costs. An embodiment of the present invention is a method to allow Direct Proof private keys (e.g., used for signing) to be delivered in signed groups in a secure manner on a distribution compact disc-read only memory (CD-ROM or CD), and subsequently installed in the device by the device itself. In one embodiment, the reduction in device storage required to support this capability may be from approximately 300 to 700 bytes down to approximately 20-25 bytes. This reduction in the amount of non-volatile storage required to implement Direct Proof-based Diffie-Hellman key exchange for devices may result in broader adoption of this technique.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In the following description, certain terminology is used to describe certain features of one or more embodiments of the invention. For instance, "platform" is defined as any type of communication device that is adapted to transmit and receive information. Examples of various platforms include, but are not limited or restricted to computer systems, personal digital assistants, cellular telephones, set-top boxes, facsimile machines, printers, modems, routers, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "challenger" refers to any entity (e.g., person, platform, system, software, and/or device) that requests some verification of authenticity or authority from another entity. Normally, this is performed prior to disclosing or providing the requested information. A "responder" refers to any entity that has been requested to provide some proof of its authority, validity, and/or identity. A "device manufacturer," which may be used interchangeably with "certifying manufacturer," refers to any entity that manufactures or configures a platform or device.

As used herein, to "prove" or "convince" a challenger that a responder has possession or knowledge of some cryptographic information (e.g., digital signature, a secret such as a key, etc.) means that, based on the information and proof disclosed to the challenger, there is a high probability that the responder has the cryptographic information. To prove this to a challenger without "revealing" or "disclosing" the cryptographic information to the challenger means that, based on the information disclosed to the challenger, it would be computationally infeasible for the challenger to determine the cryptographic information.

Such proofs are hereinafter referred to as direct proofs. The term "direct proof" refers to zero-knowledge proofs, as these types of proofs are commonly known in the field. In particular, a specific Direct Proof protocol as referenced herein is the subject of co-pending patent application Ser. No. 10/306,336, filed on Nov. 27, 2002, entitled "System and Method for Establishing Trust Without Revealing Identity," assigned to the owner of the present application. Direct Proof defines a protocol in which an issuer defines a family of many members that share common characteristics as defined by the issuer. The issuer generates a Family public and private key pair (Fpub and Fpri) that represents the family as a whole. Using Fpri, the issuer can also generate a unique Direct Proof private signing key (DPpri) for each individual member in the family. Any message signed by an individual DPpri can be verified using the family public key Fpub. However, such verification only identifies that the signer is a member of the family; no uniquely identifying information about the individual member is exposed. In one embodiment, the issuer may be a device manufacturer or delegate. That is, the issuer may be an entity with the ability to define device Families based on shared characteristics, generate the Family public/private key pair, and to create and inject DP private keys into devices. The issuer may also generate certificates for the Family public key that identify the source of the key and the characteristics of the device family.

Referring now to FIG. 1, an embodiment of a system featuring a platform implemented with a trusted hardware device (referred to as "Trusted Platform Module" or "TPM") that operates in accordance with one embodiment of the invention is shown. A first platform 102 (Challenger) transmits a request 106 that a second platform 104 (Responder) provides information about itself. In response to request 106, second platform 104 provides the requested information 108.

Additionally, for heightened security, first platform 102 may need to verify that requested information 108 came from a device manufactured by either a selected device manufacturer or a selected group of device manufacturers (hereinafter referred to as "device manufacturer(s) 110"). For instance, for one embodiment of the invention, first platform 102 challenges second platform 104 to show that it has cryptographic information (e.g., a signature) generated by device manufacturer(s) 110. The challenge may be either incorporated into request 106 (as shown) or a separate transmission. Second platform 104 replies to the challenge by providing information, in the form of a reply, to convince first platform 102 that second platform 104 has cryptographic information generated by device manufacturer(s) 110, without revealing the cryptographic information. The reply may be either part of the requested information 108 (as shown) or a separate transmission.

In one embodiment of the invention, second platform 104 comprises a Trusted Platform Module (TPM) 115. TPM 115 is a cryptographic device that is manufactured by device manufacturer(s) 110. In one embodiment of the invention, TPM 115 comprises a processor with a small amount of on-chip memory encapsulated within a package. TPM 115 is configured to provide information to first platform 102 that would enable it to determine that a reply is transmitted from a valid TPM. The information used is content that would not make it likely that the TPM's or second platform's identity can be determined.

Figure 2:
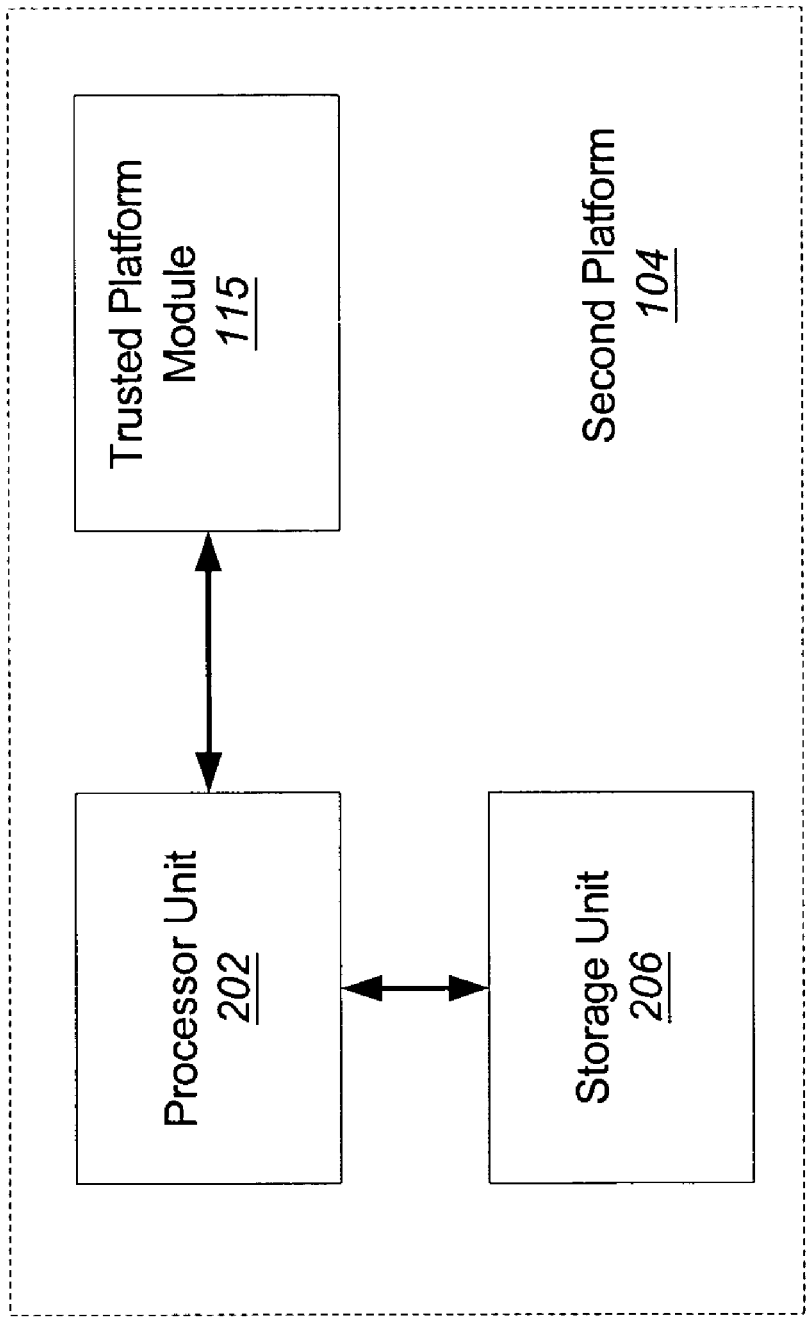
FIG. 2 illustrates a first embodiment of the platform including the TPM of FIG. 1.

FIG. 2 illustrates a first embodiment of second platform 104 with TPM 115. For this embodiment of the invention, second platform 104 comprises a processor 202 coupled to TPM 115. In general, processor 202 is a device that processes information. For instance, in one embodiment of the invention, processor 202 may be implemented as a microprocessor, digital signal processor, micro-controller or even a state machine. Alternatively, in another embodiment of the invention, processor 202 may be implemented as programmable or hard-coded logic, such as Field Programmable Gate Arrays (FPGAs), transistor-transistor logic (TTL) logic, or even an Application Specific Integrated Circuit (ASIC).

Figure 3:
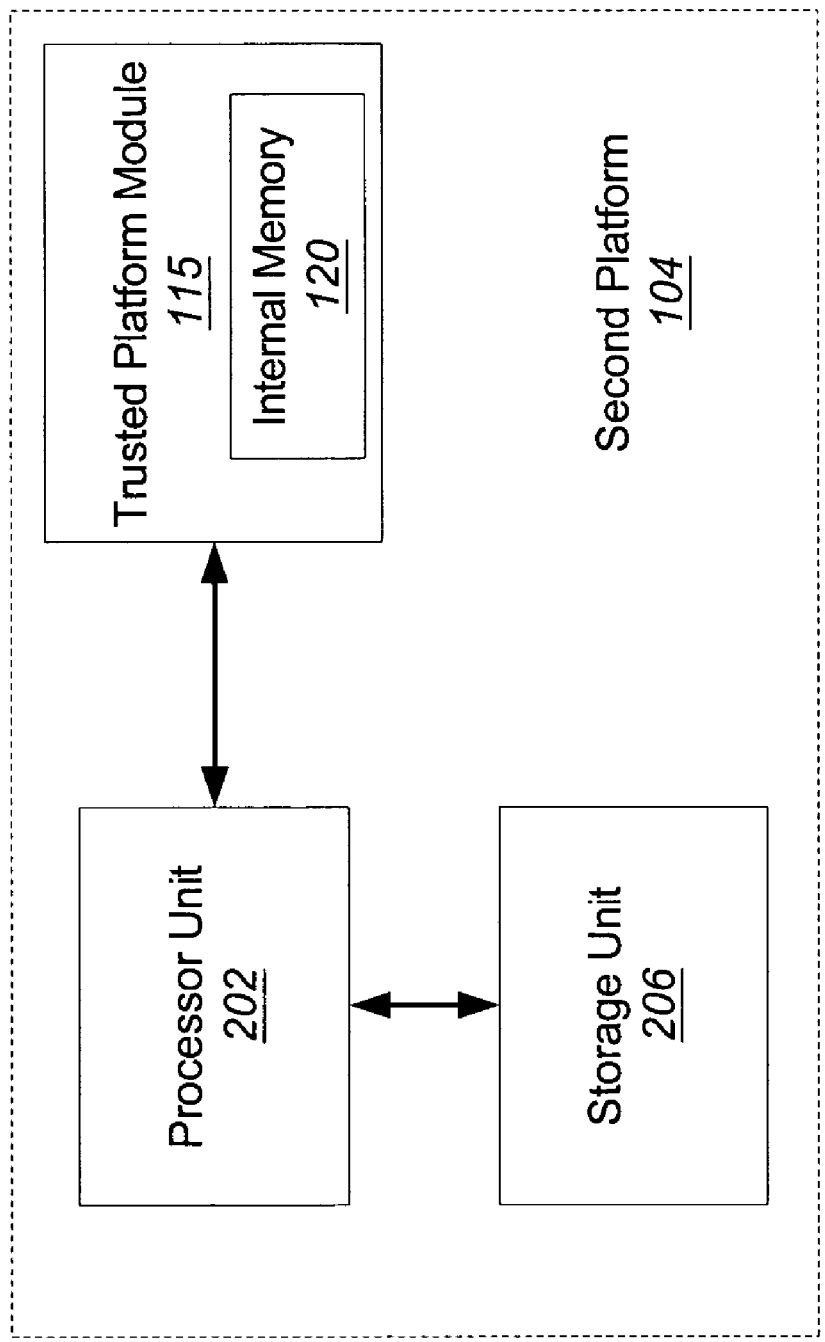
FIG. 3 illustrates a second embodiment of the platform including the TPM of FIG. 1.

Herein, second platform 104 further comprises a storage unit 206 to permit storage of cryptographic information such as one or more of the following: keys, hash values, signatures, certificates, etc. A hash value of "X" may be represented as "Hash(X)". It is contemplated that such information may be stored within internal memory 220 of TPM 115 in lieu of storage unit 206 as shown in FIG. 3. The cryptographic information may be encrypted, especially if stored outside TPM 115.

Figure 4:
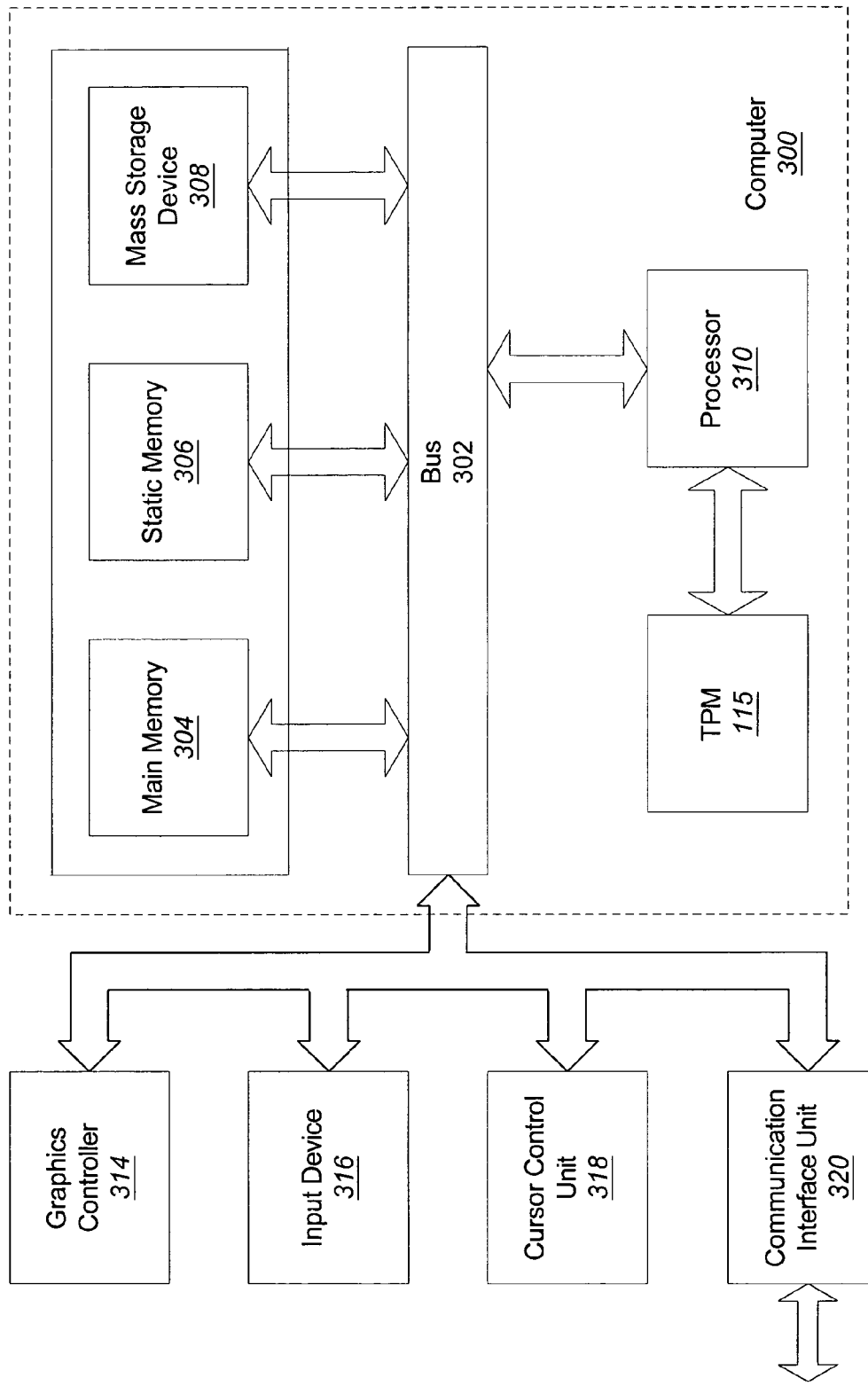
FIG. 4 illustrates an exemplary embodiment of a computer system implemented with the TPM of FIG. 2.

FIG. 4 illustrates an embodiment of a platform including a computer system 300 implemented with TPM 115 of FIG. 2. Computer system 300 comprises a bus 302 and a processor 310 coupled to bus 302. Computer system 300 further comprises a main memory unit 304 and a static memory unit 306.

Herein, main memory unit 304 is volatile semiconductor memory for storing information and instructions executed by processor 310. Main memory 304 also may be used for storing temporary variables or other intermediate information during execution of instructions by processor 310. Static memory unit 306 is non-volatile semiconductor memory for storing information and instructions for processor 310 on a more permanent nature. Examples of static memory 306 include, but are not limited or restricted to read only memory (ROM). Both main memory unit 304 and static memory unit 306 are coupled to bus 302.

In one embodiment of the invention, computer system 300 further comprises a data storage device 308 such as a magnetic disk or optical disc and its corresponding drive may also be coupled to computer system 300 for storing information and instructions.

Computer system 300 can also be coupled via bus 302 to a graphics controller device 314, which controls a display (not shown) such as a cathode ray tube (CRT), Liquid Crystal Display (LCD) or any flat panel display, for displaying information to an end user. In one embodiment, it may be desired for the graphics controller or other peripheral device to be able to establish an authenticated encrypted communications session with a software module being executed by the processor.

Typically, an alphanumeric input device 316 (e.g., keyboard, keypad, etc.) may be coupled to bus 302 for communicating information and/or command selections to processor 310. Another type of user input device is cursor control unit 318, such as a mouse, a trackball, touch pad, stylus, or cursor direction keys for communicating direction information and command selections to processor 310 and for controlling cursor movement on display 314.

A communication interface unit 320 is also coupled to bus 302. Examples of interface unit 320 include a modem, a network interface card, or other well-known interfaces used for coupling to a communication link forming part of a local or wide area network. In this manner, computer system 300 may be coupled to a number of clients and/or servers via a conventional network infrastructure, such as a company's Intranet and/or the Internet, for example.

It is appreciated that a lesser or more equipped computer system than described above may be desirable for certain implementations. Therefore, the configuration of computer system 300 will vary from implementation to implementation depending upon numerous factors, such as price constraints, performance requirements, technological improvements, and/or other circumstances.

In at least one embodiment, computer system 300 may support the use of specially-protected "trusted" software modules (e.g., tamper-resistant software, or systems having the ability to run protected programs) stored in main memory 304 and/or mass storage device 308 and being executed by processor 310 to perform specific activities, even in the presence of other hostile software in the system. Some of these trusted software modules require equivalently "trustable" protected access not just to other platforms, but to one or more devices within the same platform, such as graphics controller 314, for example. In general, such access requires that the trusted software module be able to identify the device's capabilities and/or specific identity, and then establish an encrypted session with the device to permit the exchange of data that cannot be snooped or spoofed by other software in the system.

One prior art method of both identifying the device and simultaneously establishing the encrypted session is to use a one-side authenticated Diffie-Hellman (DH) key exchange process. In this process, the device is assigned a unique public/private RSA or ECC key pair. The device holds and protects the private key, while the public key, along with authenticating certificates, may be released to the software module. During the DH key exchange process, the device signs a message using its private key, which the software module can verify using the corresponding public key. This permits the software module to authenticate that the message did in fact come from the device of interest.

However, because this authentication process uses RSA or ECC keys, the device has a unique and provable identity. Any software module that can get the device to sign a message with its private key can prove that this specific unique device is present in the computer system. Given that devices rarely migrate between processing systems, this also represents a provable unique computer system identity. Furthermore, the device's public key itself represents a constant unique value; effectively a permanent "cookie." In some cases, these characteristics may be construed as a significant privacy problem.

One alternative approach is described in co-pending patent application Ser. No. 10/999,576, filed on Nov. 30, 2004, entitled "An Apparatus and Method for Establishing an Authenticated Encrypted Session with a Device Without Exposing Privacy-Sensitive Information," assigned to the owner of the present application. In that approach, the use of RSA or ECC keys in the one-sided authenticated Diffie-Hellman process is replaced with Direct Proof keys. A device using this approach may be authenticated as belonging to a specific Family of devices, which may include assurances about the behavior or trustworthiness of the device. The approach does not expose any uniquely identifying information that could be used to establish a unique identity representing the processing system.

Although this approach works well, it requires additional storage in the device to hold the Direct Proof private key, which may be larger than a RSA or ECC key. To alleviate the burdens of this additional storage requirement, embodiments of the present invention define a system and process for ensuring that the device has the Direct Proof private key when it needs the key, without requiring substantial additional storage in the device. In one embodiment, the DP keys are delivered in signed groups to the client computer system.

In at least one embodiment of the present invention, a device manufacturer only stores a 128-bit pseudorandom number into a device while the device is being produced in the manufacturing line, while a much larger Direct Proof private key (DPpri) may be encrypted and delivered using a distribution CD. Other embodiments may store a number into the device that is longer or shorter than 128 bits. This process ensures that only a specified device can decrypt and use its assigned DPpri key.

In at least one embodiment of the present invention, DPpri encrypted data structures called "keyblobs" may be delivered in Group records signed by a device manufacturer. The entire Group record must be delivered to the device, which extracts only its own encrypted keyblob. By requiring the device to parse the entire record, and to not begin processing the extracted keyblob until the entire record has been parsed, an attacker cannot infer which keyblob was selected based on timing attacks. By signing the record, and requiring the device to verify the signature before processing its keyblob, one may ensure that an attacker cannot supply multiple copies of a single keyblob to test the device's response. In one embodiment, the best that an attacker can determine is that the device is a member of the Group. In one embodiment, the device stores a pseudorandom value of a predetermined size (e.g., 128 bits), a group identifier (e.g., 4 bytes) and a 20-byte hash of the device manufacturer's Group public key, for a total of approximately 40 bytes of data.

Figure 5:
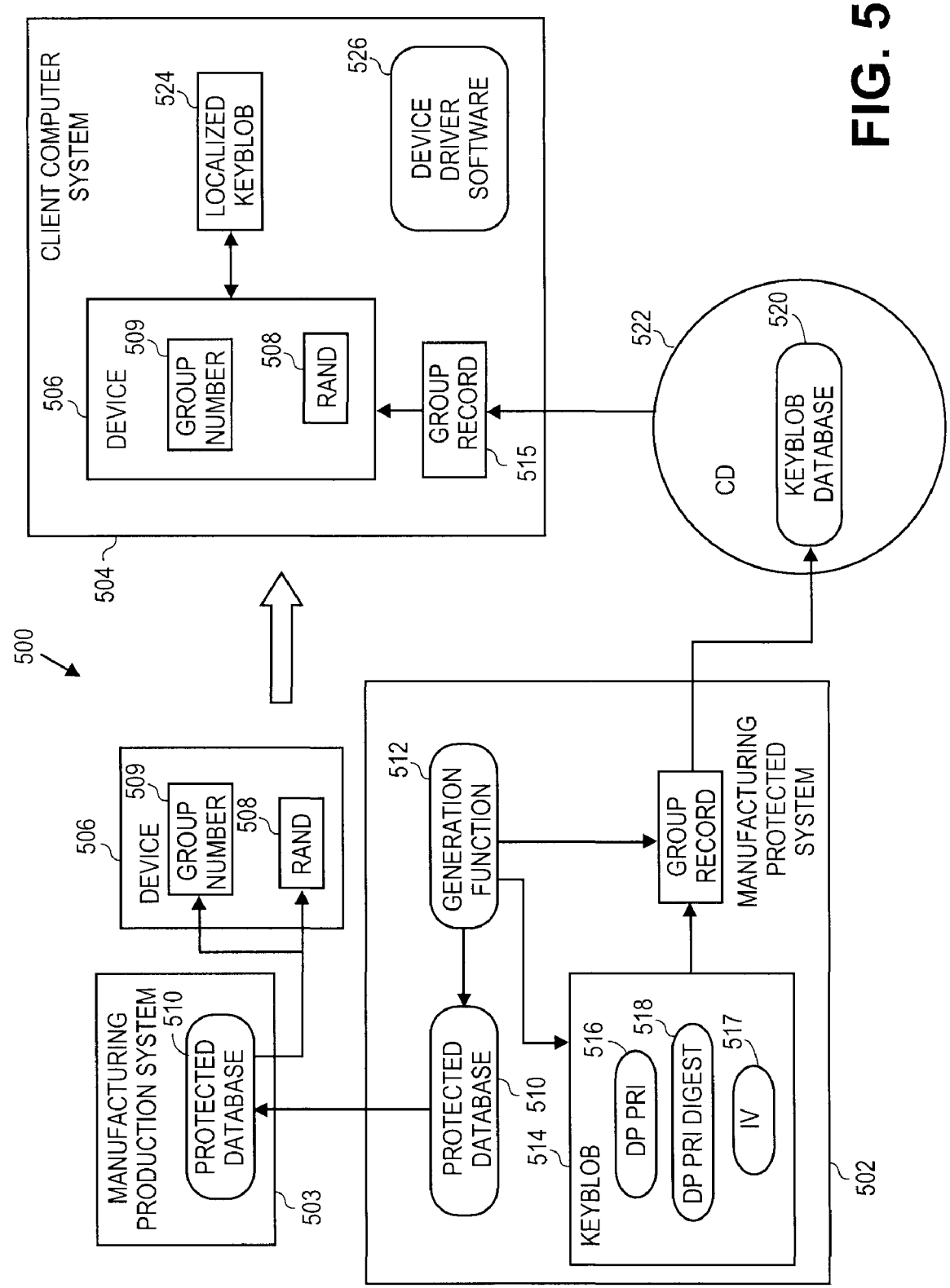
FIG. 5 is a diagram of a system for distributing Direct Proof keys in signed groups according to an embodiment of the present invention.

FIG. 5 is a diagram of a system 500 for distributing Direct Proof keys in signed groups according to an embodiment of the present invention. There are three entities in this system, a device manufacturing protected system 502, a device manufacturing production system 503, and a client computer system 504. The device manufacturing protected system comprises a processing system used in the set-up process prior to manufacturing of a device 506. The protected system 502 may be operated by a device manufacturer or other entity such that the protected system is protected from attack from hackers outside the device manufacturing site (e.g., it is a closed system). Manufacturing production system 503 may be used in the manufacturing of the devices. In one embodiment, the protected system and the production system may be the same system. Device 506 comprises any hardware device for inclusion in the client computer system (e.g., a memory controller, a peripheral device such as a graphics controller, an I/O device, other devices, etc.). In embodiments of the present invention, the device comprises a pseudorandom value RAND 508 and a Group Number 509, stored in non-volatile storage of the device.

The manufacturing protected system includes a protected database 510 and a generation function 512. The protected database comprises a data structure for storing multiple pseudorandom values (at least as many as one per device to be manufactured) generated by generation function 512 in a manner as described below. The generation function comprises logic (either implemented in software or hardware) to generate a data structure called a keyblob 514 herein. Keyblob 514 comprises at least three data items. A unique Direct Proof private key (DPpri) comprises a cryptographic key which may be used by a device for signing. DP private digest 518 (DPpri Digest) comprises a message digest of DPpri 516 according to any well-known method of generating a secure message digest, such as SHA-1. Some embodiments may include a pseudorandom initialization vector (IV)517 comprising a bit stream as part of the keyblob for compatibility purposes. If a stream cipher is used for the encryption, then the IV is used in a well known method for using an IV in a stream cipher. If a block cipher is used for the encryption, then the IV will be used as part of the message to be encrypted, thus making each instance of the encryption be different.

In embodiments of the present invention, the manufacturing protected system generates one or more keyblobs (as described in detail below) and stores the keyblobs in Group Records 515 in a keyblob database 520 on a CD 522. In one embodiment, there may be many keyblobs in each Group Record, and many Group Records on a single CD, in any combination, the only limitation being the physical storage limits of the CD. Thus, each Group Record comprises a plurality of keyblobs. The CD is then distributed through typical physical channels to computer system manufacturers, computer distributors, client computer system consumers, and others. Although a CD is described herein as the storage medium, any suitable removable storage medium may be used (e.g., a digital versatile disk (DVD), or other medium).

A client computer system 504 desiring to use a Direct Proof protocol for authentication and key exchange of a communications session with device 506 included within system 504 may read a selected Group Record 515 out of the keyblob database 520 on the CD, once the CD is inserted into a CDROM drive (not shown) of the client computer system. The keyblob data may be obtained from the Group Record and used by the device to generate a localized keyblob 524 (as described below) for use in implementing the Direct Proof protocol. In embodiments of the present invention, a whole Group Record comprising a plurality of keyblobs is processed by the device at a time, and an attacker may not be able to determine which specific keyblob is actually being used to generate the encrypted localized keyblob. Device driver software 526 is executed by the client computer system to initialize and control device 506.

Figure 6:
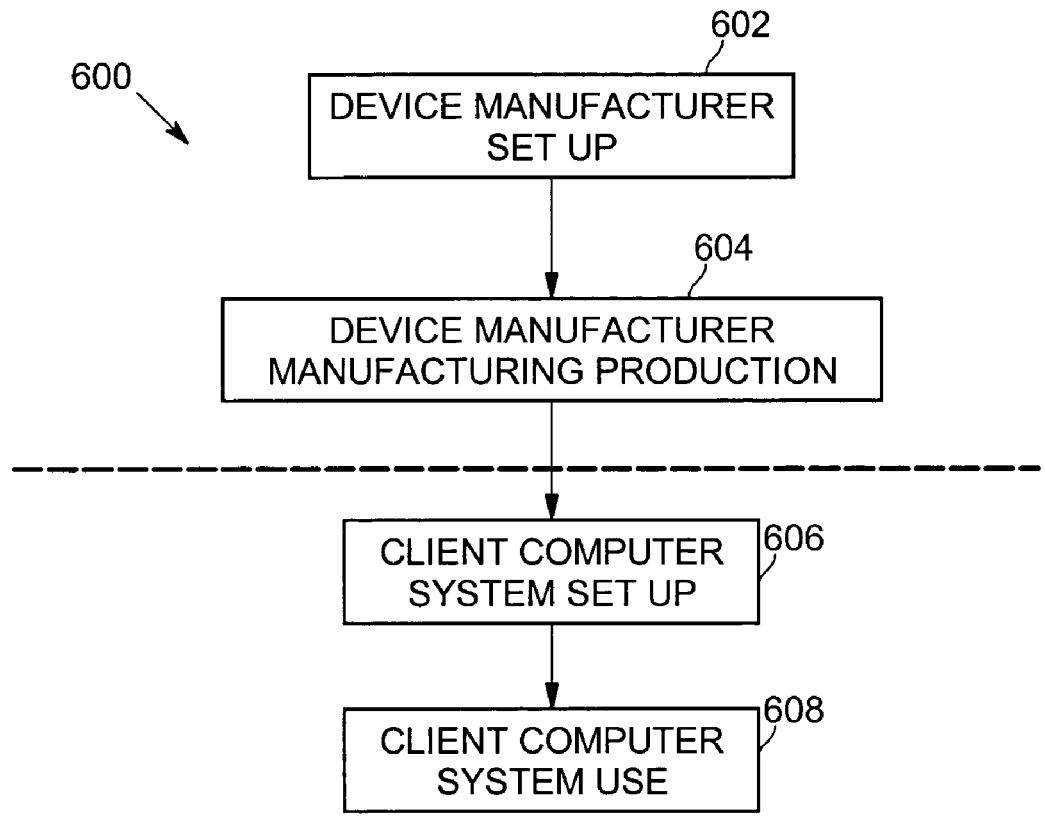
FIG. 6 is a flow diagram illustrating stages of a method of distributing Direct Proof keys in signed groups according to an embodiment of the present invention.

In embodiments of the present invention, there may be four distinct stages of operation. FIG. 6 is a flow diagram 600 illustrating stages of a method of distributing Direct Proof keys according to an embodiment of the present invention. According to embodiments of the present invention, certain actions may be performed at each stage. At a site of a device manufacturer, there are at least two stages: set-up stage 602 and manufacturing production stage 604. The set-up stage is described herein with reference to FIG. 7. The manufacturing production stage is described herein with reference to FIG. 8. At a consumer site having the client computer system, there are at least two stages: set-up stage 606, and use stage 608. The client computer system set-up stage is described herein with reference to FIG. 9. The client computer system use stage is described herein with reference to FIG. 10.

Figure 7:
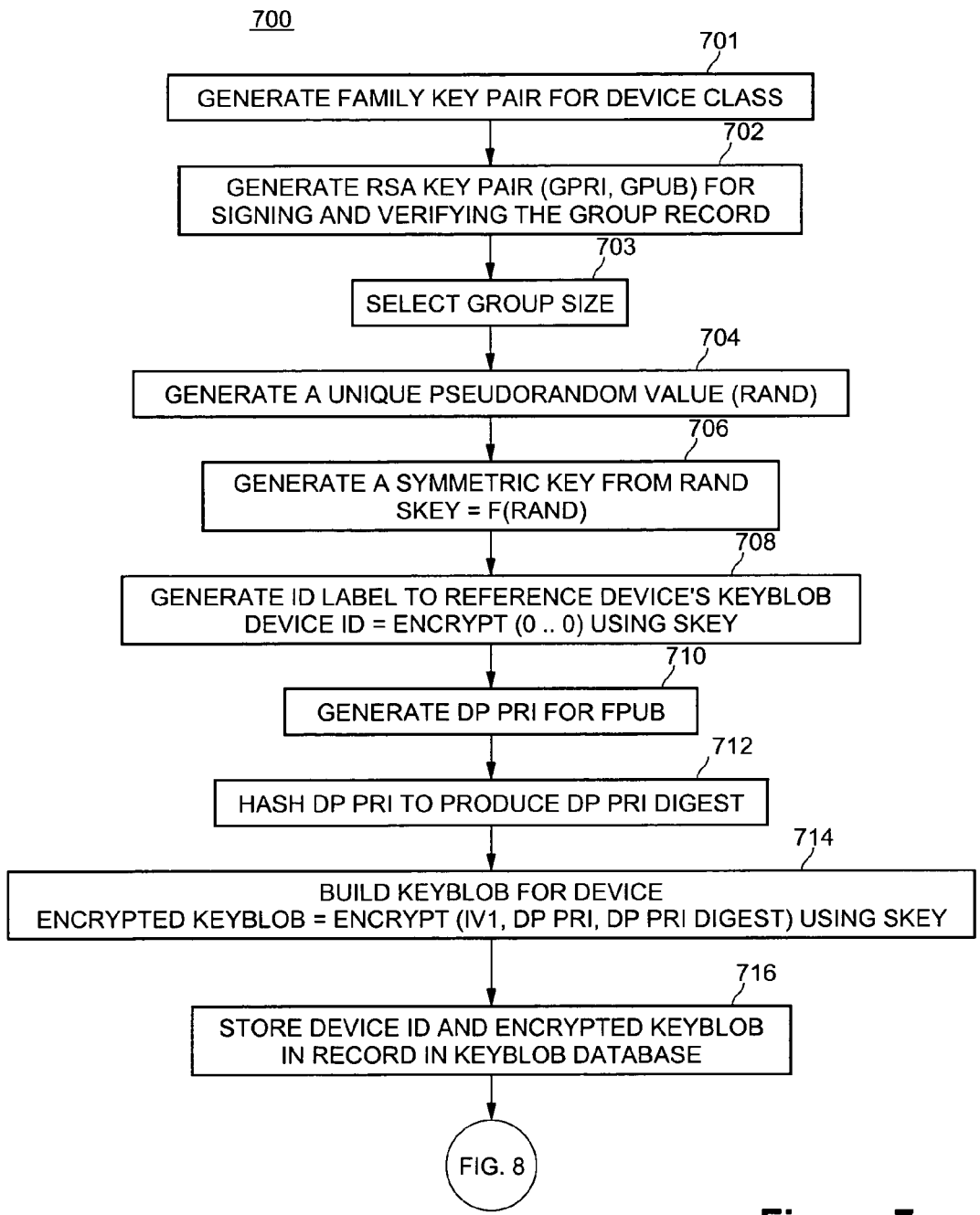
FIGS. 7 and 8 are flow diagrams illustrating device manufacturing set-up processing according to an embodiment of the present invention.
Figure 8:
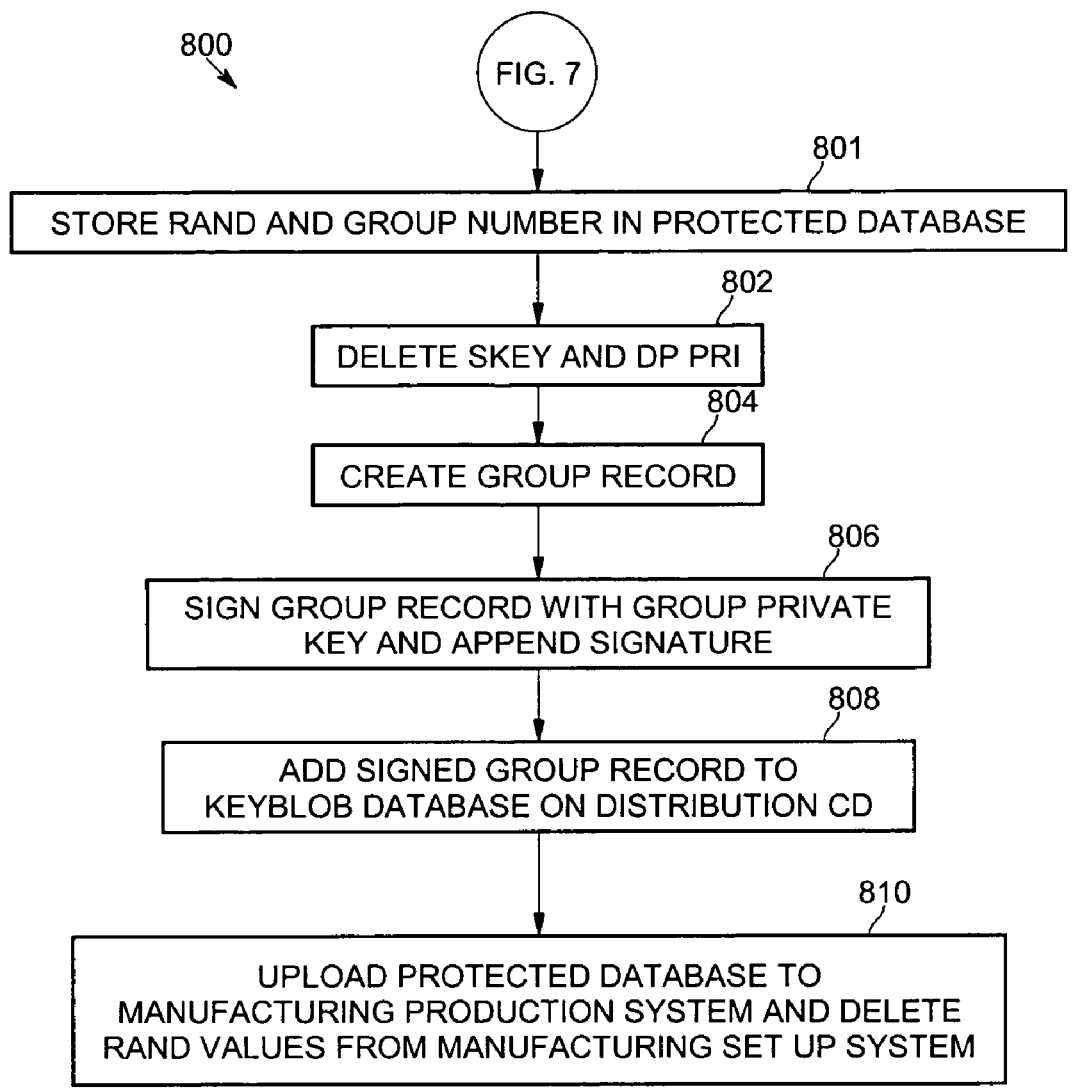

FIGS. 7 and 8 are flow diagrams 700 and 800 illustrating device manufacturing set-up processing according to an embodiment of the present invention. In one embodiment, a device manufacturer may perform these actions using a manufacturing protected system 502. At block 701, the device manufacturer generates a Direct Proof Family key pair (Fpub and Fpri) for each class of devices to be manufactured. Each unique device will have a corresponding DPpri key such that a signature created using DPpri may be verified by Fpub. A class of devices may comprise any set or subset of devices, such as a selected product line (i.e., type of device) or subsets of a product line based on version number, or other characteristics of the devices. The Family key pair is for use by the class of devices for which it was generated.

At block 702, the device manufacturer generates an RSA key pair (Gpri, Gpub) that will be used to sign and verify the Group Record. In other embodiments, any secure digital signature system may be used instead of RSA. This key pair is independent of the Family Key pair generated in block 701, and may be used for all device groupings generated by the device manufacturer. At block 703, the device manufacturer selects a desired Group Size. The Group Size may be the number of devices in the family that will be grouped together. The Group Size is chosen to be large enough to allow an individual device to "hide" within the Group, yet not so large as to consume undue time during keyblob extraction processing by the device. In one embodiment, the Group Size may be chosen to be 5,000 devices. In other embodiments, others sizes may be used.

The device manufacturer may then generate the number of device keys specified by the Group Size. Each Group having a number of devices specified by Group Size may be designated by a Group Number. For each device to be manufactured for a given Group, generation function 512 or other modules of manufacturing protected system 502 may perform blocks 704 of FIG. 7 to 802 of FIG. 8. First, at block 704, the generation function generates a unique pseudo-random value (RAND) 508. In one embodiment, the length of RAND is 128 bits. In other embodiments, other sizes of values may be used. In one embodiment, the pseudo-random values for a number of devices may be generated in advance. At block 706, using a one-way function, f, supported by the device, the generation function generates a symmetric encryption key SKEY from the unique RAND value (SKEY=f(RAND)). The one-way function may be any known algorithm appropriate for this purpose (e.g., SHA-1, MGF1, Data Encryption Standard (DES), Triple DES, etc.). At block 708, in one embodiment, the generation function generates an identifier (ID) label that will be used to reference this device's keyblob 514 on the distribution CD 522, by using SKEY to encrypt a "null entry" (e.g., a small number of zero bytes) (Device ID=Encrypt (0 . . . 0) using SKEY. In other embodiments, other ways of generating the Device ID may be used or other values may be encrypted by SKEY.

Next, at block 710, the generation function generates the DP private signing key DPpri correlating to the device's Family public key (Fpub). At block 712, the generation function hashes DPpri to produce DPpri Digest using known methods (e.g., using SHA-1 or another hash algorithm). At block 714, the generation function builds a keyblob data structure for the device. The keyblob includes at least DPpri and DPpri Digest. In one embodiment, the keyblob also includes a random initialization vector (IV) having a plurality of pseudo-randomly generated bits. These values may be encrypted using SKEY to produce an encrypted keyblob 514. At block 716, the Device ID generated at block 708 and the encrypted keyblob 514 generated at block 714 may be stored in a record in a keyblob database 520 to be released on the distribution CD 522. In one embodiment, the record in the keyblob database may be indicated by the Device ID.

Processing continues with block 801 on FIG. 8. At block 801, the current RAND value and the current Group Number for the Group to which the device belongs may be stored in protected database 510. At block 802, SKEY and DPpri may be deleted, since they will be regenerated by the device in the field. The Group Number may be incremented for each successive Group of devices being manufactured. The creation of the DPpri Digest and the subsequent encryption by SKEY are designed so that the contents of DPpri cannot be determined by any entity that does not have possession of SKEY and so that the contents of the KeyBlob cannot be modified by an entity that does not have possession of SKEY without subsequent detection by an entity that does have possession of SKEY. In other embodiments, other methods for providing this secrecy and integrity protection could be used. In some embodiments, the integrity protection may not be required, and a method that provided only secrecy could be used. In this case, the value of DPpri Digest would not be necessary.

When the entire data set of keyblobs has been created for a Group of devices, at least that Group's keyblob database 520 may be signed and burned to a common distribution CD, to be distributed with each device (In one embodiment, one keyblob database entry may be used for each device, as indexed by the Device ID field). Thus, at block 804 the device manufacturer creates a Group Record 515. The Group Record comprises the Group Number, the Group's public key Gpub, the Group Size, and the keyblob records of the entire Group (<Group Number, Gpub, Group Size, <Device ID1, Encrypted Keyblob1>, <Device ID2, Encrypted Keyblob2>, ... >). At block 806, the device manufacturer signs the Group Record using the Group private key Gpri and appends the digital signature to the Group Record. At block 808, the signed Group Record may be added to the keyblob database on the distribution CD. In one embodiment, the distribution CD also comprises a Key Retrieval utility software module for future processing on the client computer system, whose use is described in further detail below.

At any time after block 802, at block 810 the protected database of RAND and Group Number value pairs may be securely uploaded to manufacturing production system 503 that will store the RAND and Group Number values into the devices during the manufacturing process. Once this upload has been verified, the RAND values could be securely deleted from the manufacturing protected system 502.

Figure 9:
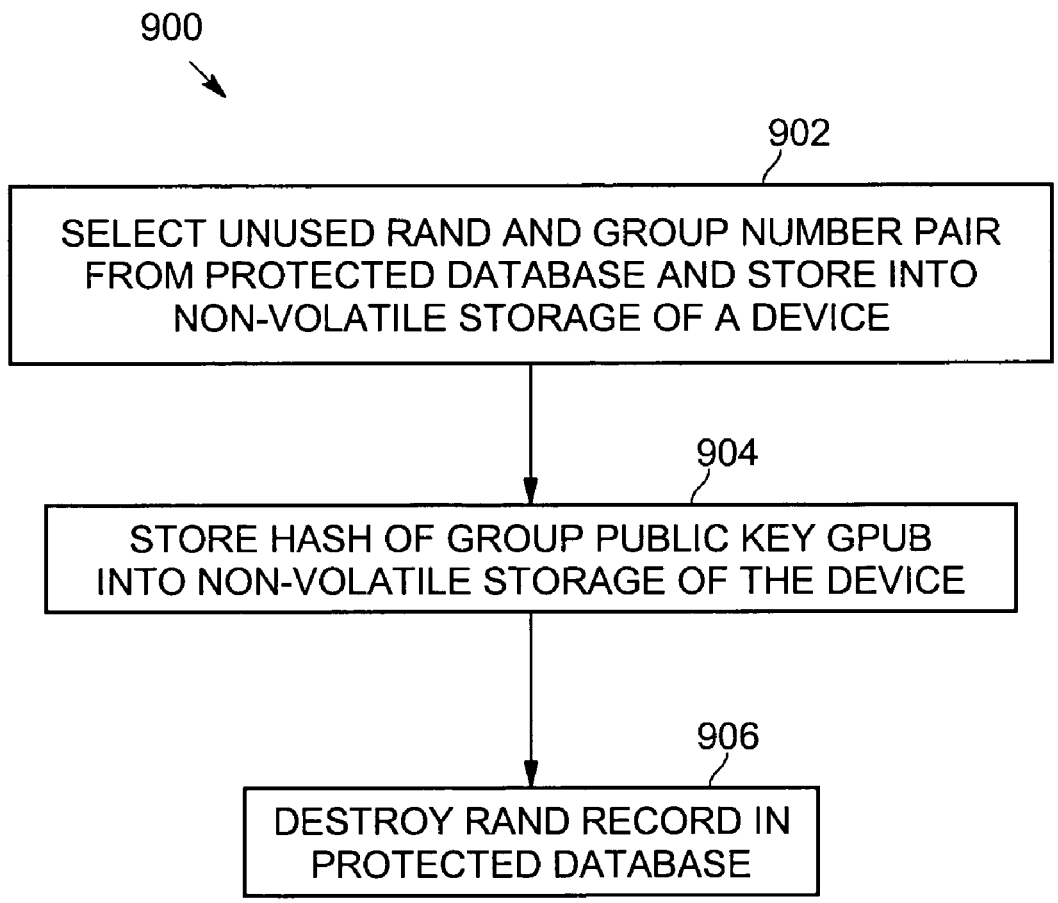
FIG. 9 is a flow diagram illustrating device manufacturing production processing according to an embodiment of the present invention.

FIG. 9 is a flow diagram 900 illustrating device manufacturing production processing according to an embodiment of the present invention. As devices are being manufacturing in a production line, at block 902 the manufacturing production system selects an unused RAND and Group Number value pair from the protected database. The selected RAND and Group Number value may then be stored into non-volatile storage in a device. In one embodiment, the non-volatile storage comprises a TPM. At block 904, a hash of the Group public key Gpub may also be stored into non-volatile storage of the device. At block 906, once the storage of the RAND value into the device is successful, the manufacturing production system destroys any record of that device's RAND value in the protected database. At this point, the sole copy of the RAND value is stored in the device.

In an alternative embodiment, the RAND value could be created during the manufacturing of a device, and then sent to the manufacturing protected system for the computation of a keyblob.

In another embodiment, the RAND value could be created on the device, and the device and the manufacturing protected system could engage in a protocol to generate the DPpri key using a method that does not reveal the DPpri key outside of the device. Then the device could create the Device ID, the SKEY, and the keyblob. The device would pass the Device ID and the keyblob to the manufacturing system for storage in protected database 510. In this method, the manufacturing system ends up with the same information (Device ID, keyblob) in the protected database, but does not know the values of RAND or of DPpri.

Figure 10:
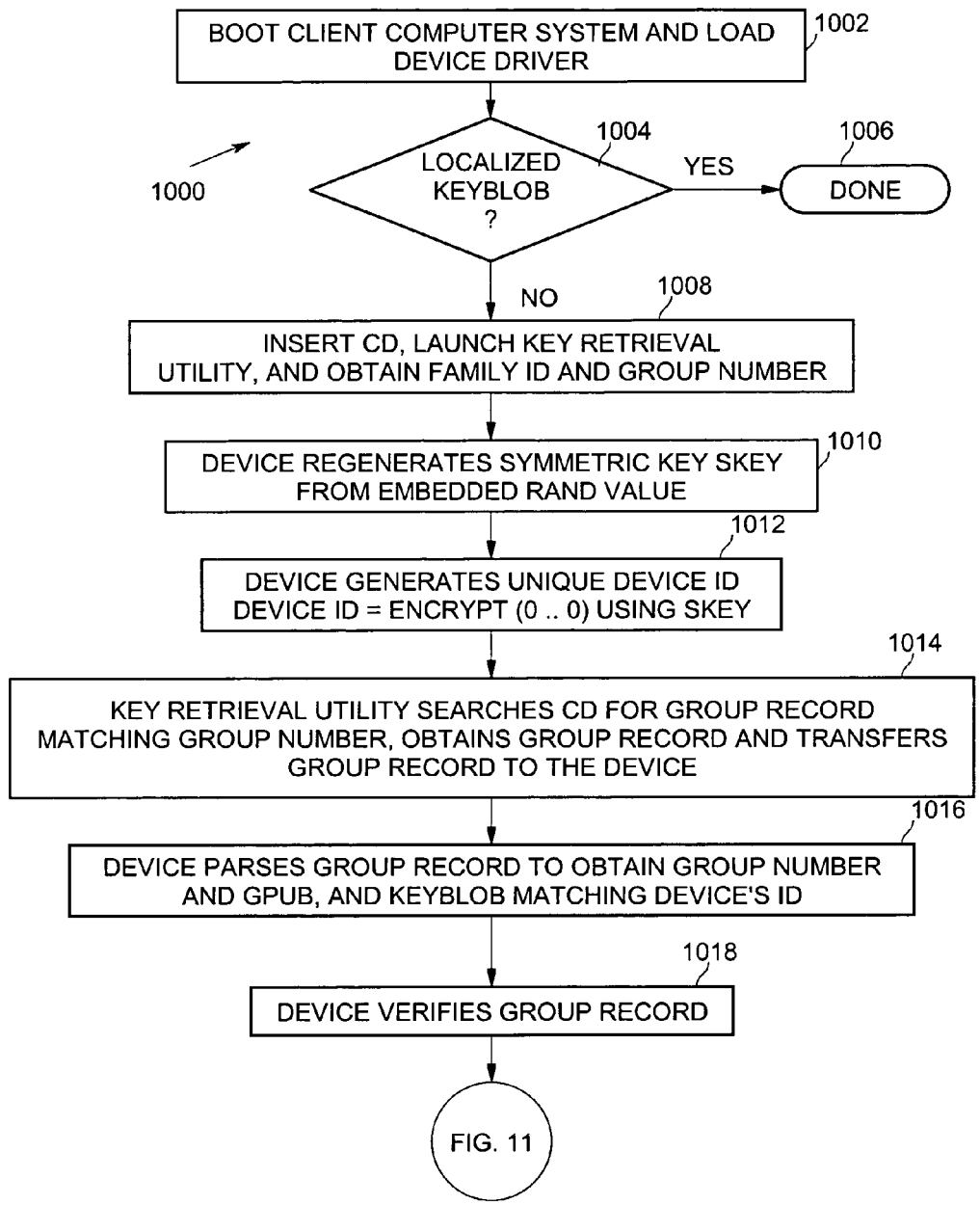
FIGS. 10 and 11 are flow diagrams of client computer system set-up processing according to an embodiment of the present invention.
Figure 11:
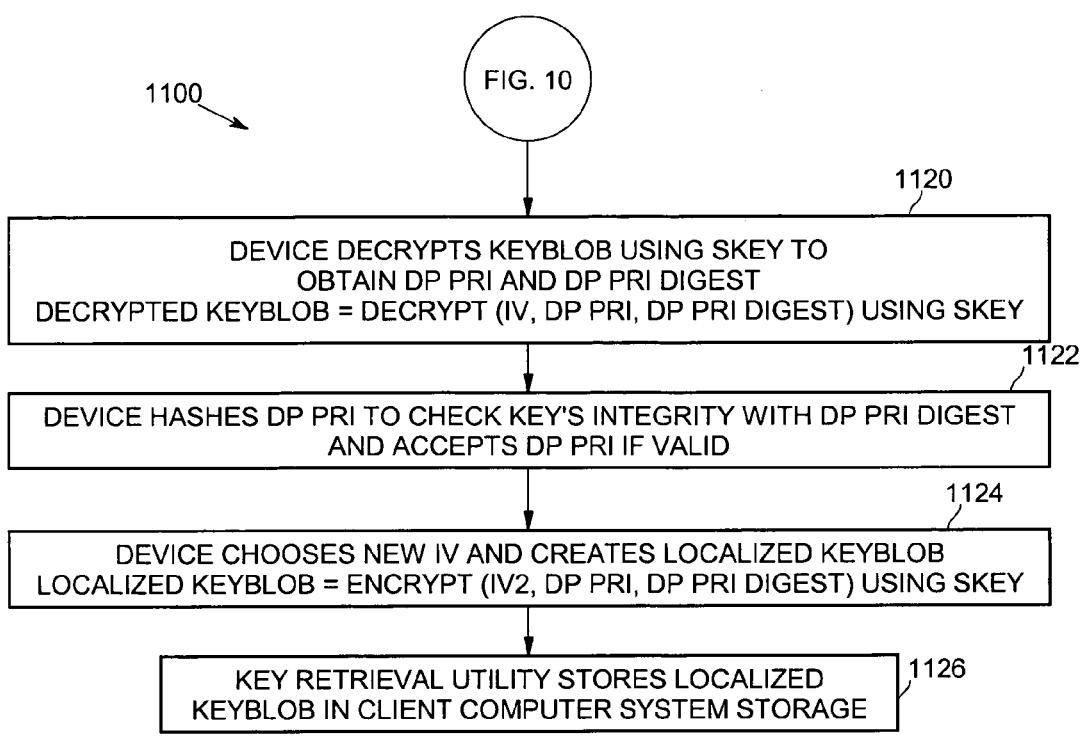

FIGS. 10 and 11 are flow diagrams 1000 and 1100 of client computer system set-up processing according to an embodiment of the present invention. A client computer system may perform these actions as part of booting up the system. At block 1002, the client computer system may be booted up in the normal manner and a device driver 526 for the device may be loaded into main memory. When the device driver is initialized and begins execution, the device driver determines at block 1004 if there is already an encrypted localized keyblob 524 stored in mass storage device 308 for device 506. If there is, then no further set-up processing need be performed and set-up processing ends at block 1006. If not, then processing continues with block 1008. At block 1008, the device driver causes the display of a message to the user of the client computer system asking for the insertion of the distribution CD 522. Once the CD is read by the computer system, the device driver then launches the Key Retrieval utility software module (not shown in FIG. 5) stored on the CD. The Key Retrieval utility asks the device for its Group ID, which may be the hash of the Group public key Gpub, and Group Number 509. The devise returns these values, which the utility uses to locate the proper signed Group Record from the keyblob database on the CD. This utility also issues an Acquire Key command to the device 506 to initiate the device's DP private key acquisition process.

In response, at block 1010 the device uses its one-way function f to regenerate the symmetric key SKEY (now for use in decryption) from the embedded RAND value 508 (SKEY=f(RAND)). At block 1012, the device then generates its unique Device ID label, by using SKEY to encrypt a "null entry" (e.g., a small number of zero bytes) (Device ID=Encrypt (0 ... 0) using SKEY). In one embodiment of the present invention, neither of these values may be exposed outside of the device. The device then signals its readiness to proceed.

At block 1014, the Key Retrieval utility searches the keyblob database 520 on the CD for the Group Record containing the matching Group Number, extracts the Group Record, and transfers the entire Group Record to the device.

At block 1016, the device parses the entire supplied Group Record, but keeps only the Group Number, the hash of the Group Record, the Group public key Gpub, and the first <Device ID, Encrypted Keyblob> field that matches the device's own Device ID (generated in block 1012). At block 1018, the device now verifies the Group Record. In one embodiment, the device compares the extracted Group Number field to the Group Number embedded in the device. If they do not match, the key acquisition process may be terminated. If not, the device hashes the extracted Gpub field and compares it to the Gpub hash embedded in the device. If the hashes do not match, the key acquisition process may be terminated. If not, the device uses the validated Gpub key to veridy the supplied signature on the hash of the Group Record. If the signature verifies, the Group Record is verified and the process continues with block 1120 on FIG. 11.

In one embodiment, if rogue software tries to send an Acquire Key command to the device after the device has the keyblob, the device does not respond to the rogue software with the Group Number. Instead, the device will return an error indicator. In effect, if the device has access to a localized keyblob, then the functionality of the Acquire Key command is disabled. In this way, the device does not reveal the Group Number except when it does not have the keyblob.

At block 1120, the device decrypts the encrypted keyblob using the symmetric key SKEY, to yield DPpri and DPpri Digest, and stores these values in its non-volatile storage (Decrypted Keyblob=Decrypt (IV, DPpri, DPpri Digest) using SKEY). The initialization vector (IV) may be discarded. At block 1122, the device then checks the integrity of DPpri by hashing DPpri and comparing the result against DPpri Digest. If the comparison is good, the device accepts DPpri as its valid key. The device may also set a Key Acquired flag to true to indicate that the DP private key has been successfully acquired. At block 1124, the device chooses a new IV and creates a new encrypted localized keyblob, using the new IV (Localized Keyblob=Encrypt (IV2, DPpri, DPpri Digest) using SKEY). The new encrypted localized keyblob may be returned to the Key Retrieval utility. At block 1126, the Key Retrieval utility stores the encrypted, localized keyblob in storage within the client computer system (such as mass storage device 308, for example). The device's DPpri is now securely stored in the client computer system.

Figure 12:
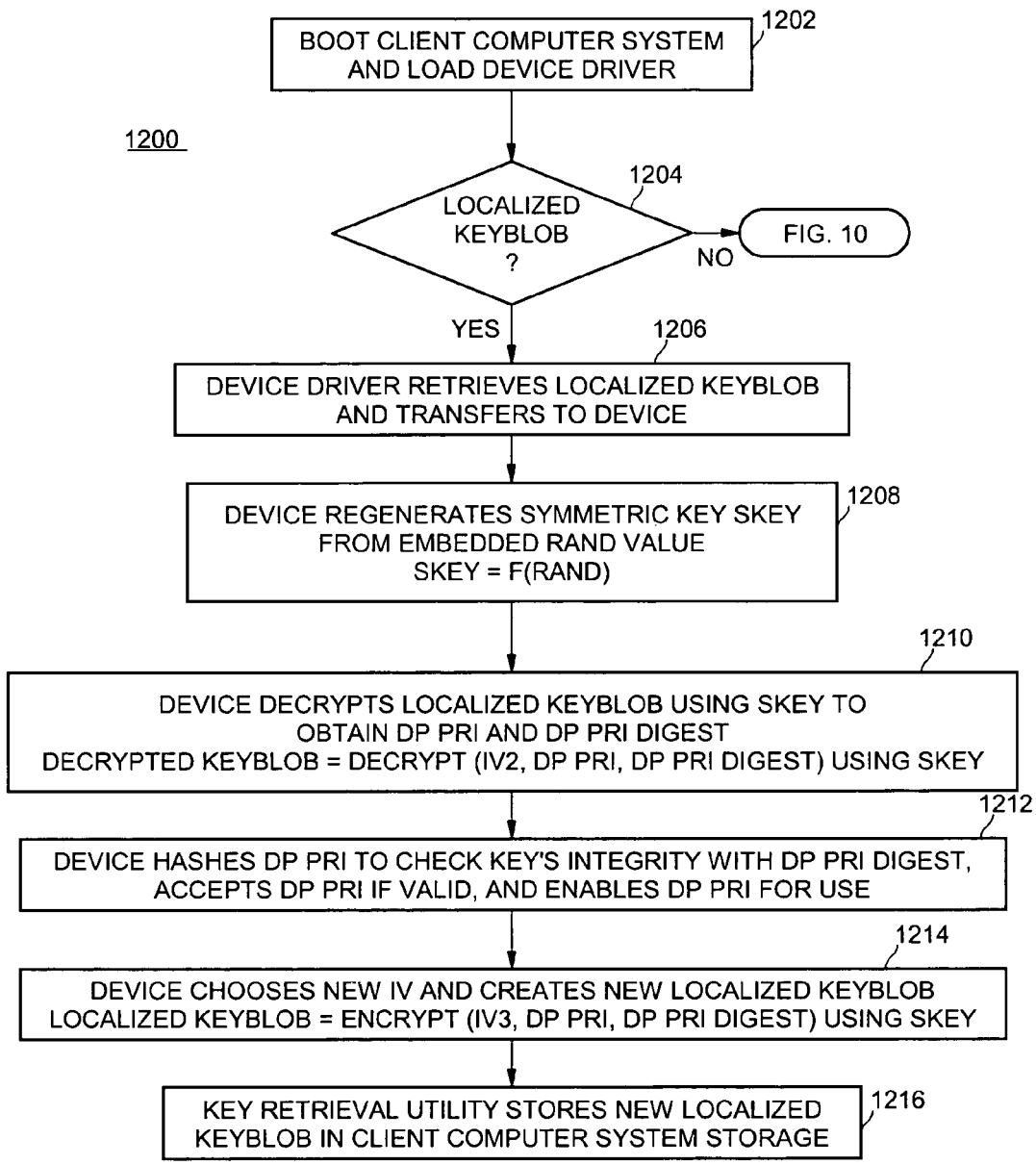
FIG. 12 is a flow diagram of client computer system processing according to an embodiment of the present invention.

Once the device has acquired DPpri during set-up processing, the device may then use DPpri. FIG. 12 is a flow diagram of client computer system processing according to an embodiment of the present invention. The client computer system may perform these actions anytime after set-up has been completed. At block 1202, the client computer system may be booted up in the normal manner and a device driver 526 for the device may be loaded into main memory. When the device driver is initialized and begins execution, the device driver determines if there is already an encrypted localized keyblob 524 stored in mass storage device 308 for device 506. If there is not, then the set-up processing of FIGS. 10 and 11 are performed. If there is an encrypted localized keyblob available for this device, then processing continues with block 1206. At block 1206, the device driver retrieves the encrypted localized keyblob and transfers the keyblob to the device. In one embodiment, the transfer of the keyblob may be accomplished by executing a Load Keyblob command.

At block 1208 the device uses its one-way function f to regenerate the symmetric key SKEY (now for use in decryption) from the embedded RAND value 508 (SKEY=f (RAND)). At block 1210, the device decrypts the encrypted localized keyblob using the symmetric key SKEY, to yield DPpri and DPpri Digest, and stores these values in its non-volatile storage (Decrypted Keyblob=Decrypt (IV2, DPpri, DPpri Digest) using SKEY). The second initialization vector (IV2) may be discarded. At block 1212, the device checks the integrity of DPpri by hashing DPpri and comparing the result against DPpri Digest. If the comparison is good (e.g., the digests match), the device accepts DPpri as the valid key acquired earlier, and enables it for use. The device may also set a Key Acquired flag to true to indicate that the DP private key has been successfully acquired. At block 1214, the device chooses yet another IV and creates a new encrypted localized keyblob, using the new IV (Localized Keyblob=Encrypt (IV3, DPpri, DPpri Digest) using SKEY). The new encrypted localized keyblob may be returned to the Key Retrieval utility. At block 1216, the Key Retrieval utility stores the encrypted, localized keyblob in storage within the client computer system (such as mass storage device 308, for example). The device's DPpri is now securely stored once again in the client computer system.

In one embodiment of the present invention, it is not necessary to generate all of the device DP private keys for the signed groups at one time. Assuming that the distribution CD is updated regularly, the device DP private keys could be generated in batches as needed. Each time the distribution CD was "burned," it would contain signed groups for the keyblob database as generated to date, including those device keys that had been generated but not yet assigned to devices.

In one embodiment, when processing the entire Group Record as in block 1018 of FIG. 10, if the device detects an error, the device may set a flag indicating that the error has occurred, but should continue processing. When all of the steps have been completed for system set-up, then the device can signal the error to the device driver. This may keep an attacker from gaining information from the type and location of the error.

In one embodiment, the methods described herein may use approximately 40 bytes of non-volatile storage in the device. In another embodiment, this may be reduced to approximately 20 bytes if the Gpub key hash is included in the device's encrypted keyblob instead of stored in non-volatile storage on the device. In this case, when the device decrypts the encrypted keyblob, the device may retrieve the Gpub hash, use the hash to check the Gpub key, and use the Gpub key to check the signature on the entire Group Record.

Although the operations discussed herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   generating a Direct Proof family key pair, including a family public key, for a class of approved devices;
   generating first and additional encrypted data structures respectively for first and additional devices in the class, the first and additional encrypted data structures respectively comprising first and additional private keys and private key digests based at least in part on the Direct Proof family key pair, wherein the family public key can be used to verify that a signature created by any of the first and additional private keys corresponds to at least one device in the class without determining which specific device created the signature;

generating first and additional identifiers respectively for the first and additional encrypted data structures based respectively on pseudo-random values for the first and additional devices;

storing the first and additional identifiers and encrypted data structures in a signed group record on a removable storage medium; and storing a group number corresponding to the signed group record and a different one of the pseudo-random values into non-volatile storage in each of the first and additional devices, without storing the first and additional private keys respectively in the first and additional devices.

2. The method of claim 1, further comprising distributing the removable storage medium and the first device.

3. The method of claim 1, further comprising generating a key pair for signing and verifying the group record.

4. The method of claim 3, further comprising storing a hash of the public key of the group record key pair into non-volatile storage of the first device.

5. The method of claim 1, further comprising selecting a group size for the signed group record.

6. The method of claim 1, wherein:
the first and additional private keys comprise Direct Proof private signing keys associated with the Direct Proof family key pair
further comprising hashing the Direct Proof private signing keys to generate private key digests and including the private key digests in the encrypted data structures.

7. The method of claim 1, further comprising generating a symmetric key based on the pseudo-random value for the first device.

8. The method of claim 7, wherein generating the first identifier comprises encrypting a data value using the symmetric key.

9. The method of claim 7, further comprising encrypting the first data structure using the symmetric key.

10. The method of claim 1, wherein the first encrypted data structure further comprises a random initialization vector.

11. The method of claim 1, wherein the pseudo-random value for the first device is unique.

12. An article comprising:
a first storage medium having a plurality of machine readable instructions, wherein when the instructions are executed by a processor, the instructions provide for:
generating a Direct Proof family key pair, including a family public key, for a class of approved devices;
generating first and additional encrypted data structures respectively for first and additional devices in the class, the first and additional encrypted data structures respectively comprising first and additional private keys and private key digests based at least in part on the Direct Proof family key pair, wherein the family public key can be used to verify that a signature created by any of the first and additional private keys corresponds to at least one device in the class without determining which specific device created the signature;

generating first and additional identifiers respectively for the first and additional encrypted data structures based respectively on pseudo-random values for the first and additional devices;

storing the first and additional identifiers and encrypted data structures in a signed group record on a removable storage medium; and causing the storing of a group number corresponding to the signed group record and a different one of the pseudo-random values into non-volatile storage in each of the first and additional devices, without storing the first and additional private keys respectively in the first and additional devices.

13. The article of claim 12, further comprising instructions for generating a key pair for signing and verifying the group record.

14. The article of claim 13, further comprising instructions for storing a hash of the public key of the group record key pair into non-volatile storage of the first device.

15. The article of claim 12, further comprising instructions for selecting a group size for the signed group record.

16. The article of claim 12, wherein:
the first and additional private keys comprise Direct Proof private signing keys associated with the Direct Proof family key pair
further comprising instructions for hashing the Direct Proof private signing keys to generate private key digests and including the private key digests in the encrypted data structures.

17. The article of claim 12, further comprising instructions for generating a symmetric key based on the pseudo-random value for the first device.

18. The article of claim 17, wherein instructions for generating the first identifier comprise instructions for encrypting a data value using the symmetric key.

19. The article of claim 17, further comprising instructions for encrypting the first data structure using the symmetric key.

20. The article of claim 12 wherein the first encrypted data structure further comprises a random initialization vector.

21. A method comprising:
determining if an encrypted data structure associated with a device installed in a computer system is stored in a memory on the computer system, wherein the encrypted data structure comprises a private key based at least in part on a Direct Proof family key pair for a class of approved devices including the device, the Direct Proof family key pair comprising a family public key that can be used to verify, with regard to two different signatures created by two different private keys, that both of the signatures were created by devices in the class of approved devices; and when the encrypted data structure is not stored, initiating a private key acquisition process that comprises the device obtaining an entire signed group record, corresponding to a group number of the device, from a removable storage medium that stores a database of signed group records, the signed group record including the encrypted data structure, associated with the device, and additional encrypted data structures that respectively include additional private keys based at least in part on the Direct Proof family key pair.

22. The method of claim 21, wherein the removable storage medium comprises at least one of a CD and a digital versatile disk (DVD) created by a manufacturer of the device.

23. The method of claim 21, wherein obtaining the encrypted data structure comprises issuing an acquire key command to the device to initiate the private key acquisition process.

24. The method of claim 21, wherein the private keys comprise Direct Proof private signing keys associated with the Direct Proof family key pair for the class of approved devices.

25. The method of claim 23, wherein the private key acquisition process comprises generating a symmetric key based on a unique pseudo-random value stored in the device.

26. The method of claim 25, wherein the private key acquisition process comprises generating a device identifier, based on the pseudo-random value, for the encrypted data structure.

27. The method of claim 26, further comprising the device completely parsing the entire signed group record to thereafter obtain a group number and a group public key and select the encrypted data structure corresponding to the device identifier from among the encrypted data structures included in the group record.

28. The method of claim 21, further comprising verifying the signed group record.

29. The method of claim 27, wherein the private key acquisition process further comprises decrypting the encrypted data structure received from the removable storage medium using the symmetric key to obtain the private key and a private key digest.

30. The method of claim 29, wherein the private key acquisition process further comprises hashing the private key to generate a new private key digest, comparing the private key digest from the decrypted data structure with the new private key digest, and accepting the private key as valid for the device when the digests match.

31. The method of claim 21 further comprising:
obtaining the removable storage medium from a supplier; and
the device selecting and decrypting the encrypted data structure associated with the device, but not decrypting the additional encrypted data structures, all without informing the supplier as to which particular encrypted data structure the device selected.

32. The method of claim 31 further comprising:
generating, via the private key acquisition process, a symmetric key based on a unique pseudo-random value stored in the device; and
the device selecting and decrypting the encrypted data structure after a copy of the unique pseudo-random value, located outside the device, has been deleted.

33. The method of claim 31 further comprising storing the decrypted private key in on-chip memory of a processor included in the device but not storing any of the additional private keys in the memory.

34. An article comprising:
a first storage medium having a plurality of machine readable instructions, wherein when the instructions are executed by a processor, the instructions provide for obtaining a private key from a signed group record for a device installed in a computer system by:
determining if an encrypted data structure associated with a device installed in a computer system is stored in a memory on the computer system, wherein the encrypted data structure comprises a private key based at least in part on a Direct Proof family key pair for a class of approved devices including the device, the Direct Proof family key pair comprising a family public key that can be used to verify, with regard to two different signatures created by two different private keys, that both of the signatures were created by devices in the class of approved devices; and
when the encrypted data structure is not stored, initiating a private key acquisition process that comprises the device obtaining an entire signed group record, corresponding to a group number of the device, from a removable storage medium that stores a database of signed group records, the signed group record including the encrypted data structure, associated with the device, and additional encrypted data structures that respectively include additional private keys based at least in part on the Direct Proof family key pair.

35. The article of claim 34, wherein instructions for obtaining the encrypted data structure comprise instructions for issuing an acquire key command to the device to initiate the private key acquisition process.

36. The article of claim 34, wherein the private keys comprise Direct Proof private signing keys associated with the Direct Proof family key pair for the class of approved devices.

37. The article of claim 35, wherein the private key acquisition process comprises generating a symmetric key based on a unique pseudo-random value stored in the device.

38. The article of claim 35, wherein the private key acquisition process comprises generating a device identifier, based on the pseudo-random value, for the encrypted data structure.

39. The article of claim 38, further comprising parsing the signed group record to obtain a group number, a group public key, and the encrypted data structure corresponding to the device identifier.

40. The article of claim 39, wherein the private key acquisition process further comprises decrypting the encrypted data structure received from the removable storage medium using the symmetric key to obtain the private key and a private key digest.

41. The method of claim 40, wherein the private key acquisition process further comprises hashing the private key to generate a new private key digest, comparing the private key digest from the decrypted data structure with the new private key digest, and accepting the private key as valid for the device when the digests match.

* * * * *